US012811680B2

(12) United States Patent
Frankel et al.

(10) Patent No.: US 12,811,680 B2
(45) Date of Patent: Nov. 24, 2026

(54) MONITORING SIGNAL QUALITY OF TRANSCEIVERS

(71) Applicant: Ciena Corporation, Hanover, MD (US)

(72) Inventors: Michael Y. Frankel, Hallandale Beach, FL (US); Vladimir Pelekhaty, Baltimore, MD (US); Michael J. Wingrove, Stittsville (CA)

(73) Assignee: Ciena Corporation, Fulton, MD (US)

( * ) Notice: Subject to any disclaimer, the term of this patent is extended or adjusted under 35 U.S.C. 154(b) by 200 days.

(21) Appl. No.: 18/766,216

(22) Filed: Jul. 8, 2024

(65) Prior Publication Data

US 2026/0012255 A1 Jan. 8, 2026

(51) Int. Cl.
*H04B 10/079* (2013.01)

(52) U.S. Cl.
CPC ................................ *H04B 10/0795* (2013.01)

(58) Field of Classification Search
CPC ................................................ H04B 10/0795
USPC .......................................................... 398/33
See application file for complete search history.

(56) References Cited

U.S. PATENT DOCUMENTS

| | | | |
|---|---|---|---|
| 4,740,682 | A | 4/1988 | Frankel |
| 4,910,395 | A | 3/1990 | Frankel |
| 5,991,036 | A | 11/1999 | Frankel |
| 6,100,831 | A | 8/2000 | Frankel |
| 6,137,442 | A | 10/2000 | Roman et al. |
| 6,215,592 | B1 | 4/2001 | Pelekhaty |
| 6,243,175 | B1 | 6/2001 | Pelekhaty |
| 6,301,042 | B1 | 10/2001 | Pelekhaty |
| 6,335,562 | B1 | 1/2002 | Dietrich et al. |
| 6,362,759 | B1 | 3/2002 | Biernacki et al. |
| 6,404,806 | B1 | 6/2002 | Ginesi et al. |
| 6,407,863 | B1 | 6/2002 | Archambault et al. |
| 6,430,336 | B1 | 8/2002 | Frankel |

(Continued)

FOREIGN PATENT DOCUMENTS

| | | | | |
|---|---|---|---|---|
| JP | 2025018872 A | * | 2/2025 | ......... H04B 10/0795 |
| WO | WO-2017216841 A1 | * | 12/2017 | ............. H04B 10/54 |

OTHER PUBLICATIONS

T. Morgan, Y. R. Zhou, A. Lord and T. Anderson, "Non-intrusive simultaneous measurement of OSNR, CD and PMD on live WDM system," OFC/NFOEC, Los Angeles, CA, USA, 2012, pp. 1-3.*

(Continued)

*Primary Examiner* — Kenneth N Vanderpuye
(74) *Attorney, Agent, or Firm* — Baratta Law PLLC; Lawrence A. Baratta, Jr.

(57) ABSTRACT

Circuits, systems, and methods are provided for monitoring the quality of signals. According to one implementation, a signal quality monitoring circuit is configured to perform a step of intermittently sampling a signal waveform transmitted along a communication channel to obtain a plurality of samples. For example, the signal waveform includes a series of modulated symbols encoded over time and is sampled at a sampling rate lower than a symbol rate of the signal waveform. Also, the circuit is configured to perform a step of mapping the plurality of samples onto a two-dimensional diagram showing distinct amplitude levels and modulation characteristics. The circuit is then configured to perform a step of analyzing the two-dimensional diagram to determine signal quality of the signal waveform.

19 Claims, 7 Drawing Sheets

(56) References Cited

U.S. PATENT DOCUMENTS

| | | | |
|---|---|---|---|
| 6,496,297 | B1 | 12/2002 | Frankel et al. |
| 6,693,957 | B1 | 2/2004 | Wingrove et al. |
| 6,721,355 | B1 | 4/2004 | Mcclennon et al. |
| 6,765,659 | B1 | 7/2004 | Bhatnagar et al. |
| 6,795,607 | B1 | 9/2004 | Archambault et al. |
| 6,907,201 | B1 | 6/2005 | Frankel |
| 6,980,738 | B1 | 12/2005 | Frankel et al. |
| 7,184,215 | B2 | 2/2007 | Pelekhaty |
| 7,254,327 | B1 | 8/2007 | Zhong et al. |
| 7,310,318 | B1 | 12/2007 | Frankel et al. |
| 7,343,101 | B1 | 3/2008 | Frankel et al. |
| 7,415,208 | B1 | 8/2008 | Haggans et al. |
| 7,512,343 | B2 | 3/2009 | Sridhar et al. |
| 7,634,194 | B2 | 12/2009 | Frankel et al. |
| 7,679,937 | B2 | 3/2010 | Wingrove et al. |
| 7,693,357 | B2 | 4/2010 | Marrakchi El Fellah et al. |
| 7,801,256 | B2 | 9/2010 | Wingrove et al. |
| 7,853,157 | B2 | 12/2010 | Grigoryan et al. |
| 7,962,049 | B2 | 6/2011 | Mateosky et al. |
| 8,005,375 | B2 | 8/2011 | Frankel |
| 8,045,855 | B2 | 10/2011 | Frankel |
| 8,280,258 | B2 | 10/2012 | Frankel |
| 8,433,192 | B2 | 4/2013 | Frankel et al. |
| 8,582,705 | B2 | 11/2013 | Frankel et al. |
| 8,625,994 | B2 | 1/2014 | Archambault et al. |
| 8,699,880 | B2 | 4/2014 | Grigoryan et al. |
| 8,787,771 | B2 | 7/2014 | Frankel |
| 8,798,455 | B2 | 8/2014 | Frankel |
| 8,884,649 | B1 | 11/2014 | Mateosky et al. |
| 8,908,745 | B2 | 12/2014 | Pelekhaty et al. |
| 8,977,125 | B2 | 3/2015 | Grigoryan et al. |
| 8,983,293 | B2 | 3/2015 | Frankel et al. |
| 9,191,117 | B2 | 11/2015 | Alexander et al. |
| 9,207,461 | B2 | 12/2015 | Frankel et al. |
| 9,270,405 | B2 | 2/2016 | Blair et al. |
| 9,374,166 | B2 | 6/2016 | Frankel et al. |
| 9,419,725 | B2 | 8/2016 | Grigoryan et al. |
| 9,509,410 | B2 | 11/2016 | Mateosky et al. |
| 9,515,767 | B2 | 12/2016 | Frankel et al. |
| 9,835,880 | B2 | 12/2017 | Frankel et al. |
| 10,141,926 | B2 | 11/2018 | Pelekhaty et al. |
| 10,142,092 | B2 | 11/2018 | Frankel et al. |
| 10,194,221 | B2 | 1/2019 | Frankel et al. |
| 10,200,305 | B2 | 2/2019 | Pelekhaty et al. |
| 10,239,749 | B2 | 3/2019 | Frankel et al. |
| 10,274,682 | B2 | 4/2019 | Frankel et al. |
| 10,313,014 | B2 | 6/2019 | Pelekhaty et al. |
| 10,313,021 | B1 | 6/2019 | Frankel et al. |
| 10,404,365 | B2 | 9/2019 | Frankel et al. |
| 10,425,322 | B2 | 9/2019 | Blair et al. |
| 10,476,815 | B2 | 11/2019 | Pelekhaty et al. |
| 10,715,888 | B2 | 7/2020 | Swinkels et al. |
| 10,855,623 | B2 | 12/2020 | Estabrooks et al. |
| 11,121,984 | B2 | 9/2021 | Frankel et al. |
| 11,196,504 | B1 | 12/2021 | Frankel et al. |
| 11,283,524 | B2 | 3/2022 | Frankel et al. |
| 11,388,492 | B2 | 7/2022 | Frankel et al. |
| 11,553,259 | B2 | 1/2023 | Boertjes et al. |
| 11,563,687 | B2 | 1/2023 | Frankel et al. |
| 11,624,881 | B2 | 4/2023 | Wingrove et al. |
| 11,711,270 | B1 | 7/2023 | Pelekhaty et al. |
| 11,799,549 | B2 | 10/2023 | Frankel et al. |
| 2002/0080824 | A1 | 6/2002 | Wingrove |
| 2004/0062472 | A1 | 4/2004 | Frankel et al. |
| 2005/0094252 | A1 | 5/2005 | Haggans et al. |
| 2005/0100271 | A1 | 5/2005 | Frankel |
| 2006/0127086 | A1 | 6/2006 | Frankel |
| 2006/0139742 | A1 | 6/2006 | Frankel et al. |
| 2007/0025730 | A1 | 2/2007 | Frankel |
| 2007/0081247 | A1 | 4/2007 | Pelekhaty |
| 2007/0127489 | A1 | 6/2007 | Amaya et al. |
| 2007/0166032 | A1 | 7/2007 | Frankel |
| 2007/0264024 | A1 | 11/2007 | Zheng et al. |
| 2008/0007002 | A1 | 1/2008 | Frankel et al. |
| 2008/0018990 | A1 | 1/2008 | Sridhar et al. |
| 2009/0103931 | A1 | 4/2009 | Grigoryan et al. |
| 2010/0329694 | A1 | 12/2010 | Frankel |
| 2011/0033195 | A1 | 2/2011 | Frankel |
| 2012/0183092 | A1 | 7/2012 | Pelekhaty et al. |
| 2013/0182585 | A1 | 7/2013 | Chaudhary et al. |
| 2014/0064102 | A1 | 3/2014 | Frankel et al. |
| 2014/0117774 | A1 | 5/2014 | McGill, Sr. et al. |
| 2014/0369686 | A1 | 12/2014 | Pelekhaty et al. |
| 2015/0075957 | A1 | 3/2015 | Frankel |
| 2016/0034761 | A1 | 2/2016 | Berthold et al. |
| 2016/0049964 | A1 | 2/2016 | Mateosky et al. |
| 2016/0357033 | A1 | 12/2016 | Frankel et al. |
| 2017/0122812 | A1 | 5/2017 | Bhatnagar et al. |
| 2017/0127157 | A1 | 5/2017 | Frankel et al. |
| 2018/0026632 | A1 | 1/2018 | Frankel et al. |
| 2018/0123980 | A1 | 5/2018 | Frankel et al. |
| 2019/0097728 | A1 | 3/2019 | Frankel et al. |
| 2019/0182180 | A1 | 6/2019 | Frankel et al. |
| 2019/0326992 | A1 | 10/2019 | Charlton et al. |
| 2020/0162172 | A1 | 5/2020 | Sridhar et al. |
| 2020/0236064 | A1 | 7/2020 | Frankel et al. |
| 2021/0075746 | A1 | 3/2021 | Frankel |
| 2021/0176542 | A1 | 6/2021 | Frankel et al. |
| 2022/0038391 | A1 | 2/2022 | Frankel et al. |
| 2022/0075114 | A1 | 3/2022 | Frankel et al. |
| 2022/0209868 | A1 | 6/2022 | Frankel et al. |
| 2022/0261686 | A1 | 8/2022 | Frankel et al. |
| 2023/0047613 | A1 | 2/2023 | Frankel et al. |
| 2023/0232138 | A1 | 7/2023 | Rivaud et al. |
| 2023/0308182 | A1 | 9/2023 | Frankel et al. |
| 2023/0379607 | A1* | 11/2023 | Van Veen ........... H04B 10/0731 |
| 2023/0412277 | A1 | 12/2023 | Frankel et al. |
| 2024/0061169 | A1 | 2/2024 | Frankel et al. |
| 2024/0089001 | A1* | 3/2024 | Schow ...................... G02F 3/00 |
| 2024/0113747 | A1 | 4/2024 | Frankel et al. |
| 2024/0178664 | A1 | 5/2024 | Wingrove et al. |
| 2025/0167887 | A1* | 5/2025 | Campos ............ H04B 10/0773 |

OTHER PUBLICATIONS

S. -A. Li et al., "Multiparameter Monitoring of PAM4 Signals Using Deep Learning," 2022 Conference on Lasers and Electro-Optics (CLEO), San Jose, CA, USA, 2022, pp. 1-2.*

"Instruction Manual PAM4 Signal Analysis Software", Teledyne Lecroy, (May 2018).*

Y. Sekihara et al., "Traffic Monitoring System for 100-Gbps Virtualized Optical Networks," 2022 Optical Fiber Communications Conference and Exhibition (OFC), San Diego, CA, USA, 2022, pp. 1-3.*

T. Morgan, Y. R. Zhou, A. Lord and T. Anderson, "Non-intrusive simultaneous measurement of OSNR, CD and PMD on live WDM system," OFC/NFOEC, Los Angeles, CA, USA, 2012, pp. 1-3 (Year: 2012).*

S. -A. Li et al., "Multiparameter Monitoring of PAM4 Signals Using Deep Learning," 2022 Conference on Lasers and Electro-Optics (CLEO), San Jose, CA, USA, 2022, pp. 1-2 (Year: 2022).*

"Instruction Manual PAM4 Signal Analysis Software", Teledyne Lecroy, (May 2018). (Year: 2018).*

Sekihara et al., "Traffic Monitoring System for 100-Gbps Virtualized Optical Networks," 2022 Optical Fiber Communications Conference and Exhibition (OFC), San Diego, CA, USA, 2022, pp. 1-3 (Year: 2022).*

K. Vasilakopoulos, A. Cathelin, P. Chevalier, T. Nguyen and S. P. Voinigescu, "A 108GS/s track and hold amplifier with MOS-HBT switch," 2016 IEEE MTT-S International Microwave Symposium (IMS), San Francisco, CA, USA, 2016, pp. 1-4 (Year: 2016).*

Trefor Morgan et al., "Non-intrusive Simultaneous Measurement of OSNR, CD and PMD on Live WDM system," Optical Fiber Communication Conference and Exposition (OFC/NFOEC), Mar. 4, 2021, 3 Pages.

Lei Zhu et al., "Applying Eye-diagram Analysis for Signal Transfer Quality Test in 400 Mbps SpaceWire Network," 2018 International Conference on Electronics Technology (ICET), IEEE, May 23, 2018, pp. 317-320.

(56) References Cited

OTHER PUBLICATIONS

George Moustakides et al., "Eye Diagram Reconstruction Using Asynchronous Imperfect Sampling, Application to BER Estimation for Fiber-Optic Communication Systems," 2010 18th European Signal Processing Conference, IEEE, Sep. 3, 2020, 4 Pages.

Oct. 7, 2025, International Search Report and Written Opinion for International Patent Application No. PCT/US2025/034115.

* cited by examiner

60

| | Retimed Pluggable | Linear-Drive Pluggable | Linear-Drive CPO |
|---|---|---|---|
| Power | Bad | Good | Great |
| Cost | Bad | Good | Great |
| Latency | OK | Good | Great |
| Product Maturity | Great | OK | OK |
| Serviceability | Great | Great | OK |
| Late Binding Commitment | Great | OK | Bad |
| Link Performance | Great | OK | Great |
| Link Accountability | Great | Bad | OK |
| Interoperable Ecosystem | Great | OK | OK |

FIG. 6

MONITORING SIGNAL QUALITY OF TRANSCEIVERS

FIELD OF THE DISCLOSURE

The present disclosure generally relates to communication networks. More particularly, the present disclosure relates to systems and methods for monitoring the quality of signals propagating through a transceiver.

BACKGROUND

Communication networks continue to experience rapid growth with respect to data traffic, video content, adoption of virtual and augmented reality technologies, Machine Learning (ML) and Artificial Intelligence (AI) applications, improvements in electrical and optical cable interconnections, improvements in optical transceivers, etc. In the field of electrical and optical transceivers (e.g., optical Input/Output (IO) interfaces, coherent modules, Intensity Modulated Direct Detect (IMDD) modules, optical pluggable modules, etc.), expense and power consumption are issues that continue to be addressed. In many cases, optical transceivers are configured to handle Non-Return-to-Zero (NRZ) signals in which binary codes represent a positive voltage (binary 1) at one level and a negative voltage (binary 0) at another level. In some respects, NRZ may also be referred to as a two-level Pulse Amplitude Modulation (PAM2) format. Some advancements in network components involve a change to PAM4, which allows the transmission of two bits per symbol, represented by four signal levels. Thus, each symbol in a PAM4 format may include binary combinations 00, 01, 10, 11 (i.e., value of 0, 1, 2, 3) to transport twice as many bits per unit time than NRZ or PAM2. However, since PAM4 is a relatively young standard, some issues have yet to be resolved. For example, full retimers with performance monitoring functions are typically expensive and power hungry. In addition, half retimers do not provide optical link diagnostics capabilities, yet still tend to consume large amounts of power.

BRIEF SUMMARY

The present disclosure describes circuits, systems, and methods for monitoring signal quality. In one implementation, a circuit may be configured to intermittently sample a signal waveform transmitted along a communication channel to obtain a plurality of samples. For example, the signal waveform may include a series of modulated symbols encoded over time. Also, the signal waveform may be sampled at a sampling rate lower than the symbol rate of the signal waveform. Furthermore, the circuit may also be configured to map the plurality of samples onto a two-dimensional diagram showing distinct amplitude levels and modulation characteristics. Next, the circuit may then be configured to analyze the two-dimensional diagram to determine signal quality of the signal waveform. In some embodiments, the signal waveform may have a four-level Pulse Amplitude Modulation (PAM4) format with two bits per symbol, wherein the two-dimensional diagram has a window frame format showing four distinct amplitude levels and transitions between each pair of the four distinct amplitude levels.

In accordance with additional embodiments, the communication channel may be a transmitter path or a receiver path of an optical transceiver. The optical transceiver, for example, may be configured as or incorporated in an optical Input/Output (IO) interface, an optical pluggable module, an optical-electrical interconnection module, a media converter, an Intensity Modulated Direct Detect (IMDD) module, a Linear Drive Optical (LDO) module, or a Linear Pluggable Optical (LPO) module. The circuit may be implemented in an Application-Specific Integrated Circuit (ASIC) or chiplet that is separate from the optical transceiver and may be configured to use less than 200 mW of power. Furthermore, the optical transceiver may also include a Continuous Time Linear Equalization (CTLE) component implemented in the transmitter path, a modulator, a laser driver, and/or a Trans-Impedance Amplifier (TIA) RF line driver implemented in the receiver path. In some embodiments, the receiver path of the optical transceiver may include no Serializer/Deserializer (SerDes) component or Digital Signal Processing (DSP) core.

Also, in some embodiments, the action of intermittently sampling the signal waveform may include obtaining pairs of samples, wherein a second sample of each pair is obtained at a fixed offset time after a first sample of the respective pair. For example, the fixed offset time may be smaller than a symbol period related to the symbol rate of the signal waveform. The fixed offset time may be about half of the symbol period. Also, according to some implementations, the symbol rate of the signal waveform may be at least 40 G Baud and the sampling rate may be about 100 M samples per second.

Additionally, the action of analyzing the two-dimensional diagram may further include image processing functionality to detect clarity metrics and distortion metrics with respect to the modulation characteristics. The signal quality may be proportional to the clarity metrics and inversely proportional to the distortion metrics. The modulation characteristics may include transition patterns between the distinct amplitude levels. In some embodiments, the circuit may further be configured to perform the step of automatically adjusting settings associated with a transmitter in the communication channel to reduce distortion and improve signal quality.

In some embodiments, the step of intermittently sampling may further include controllably shifting sampling points relative to a symbol period of the signal waveform to allow samples to be obtained at a plurality of different sampling points along the symbol period. The two-dimensional diagram may resemble a window frame pattern having a 9-lite framed window with grille muntins. The action of determining the signal quality may include comparing the window frame pattern with an ideal window frame plot.

According to some implementations, the circuit may include a) a selector that receives samples from test point RF taps along the communication channel, b) a sampling clock, c) one or more Track and Hold (T&H) amplifier circuits, d) one or more low rate sampler but high bandwidth ADCs, and e) a signal analyzer. The signal analyzer, for example, may use a Machine Learning (ML) model configured to analyze the two-dimensional diagram to detect distortion characteristics and measure a value that represents the signal quality based on the detected distortion characteristics. In some embodiments, the circuit may include no clock recovery, no data recovery, and no retiming functionalities. Also, the circuit may be further configured to send display information to a user interface to allow a user to view XY window-frame pattern information indicative of the signal quality.

The implementations of the monitoring functions may include power down capabilities to reduce the added power consumption of the monitoring circuit close to zero except when performing monitoring operations.

BRIEF DESCRIPTION OF THE DRAWINGS

The present disclosure is illustrated and described herein with reference to the various drawings, in which like reference numbers are used to denote like system components/method steps, as appropriate, and in which:

FIG. 6 is a table showing an example of advantages and disadvantages of different types of optical transceivers with respect to various factors.

DETAILED DESCRIPTION

In various embodiments, the present disclosure relates to systems and methods for monitoring the quality of signals propagating through electrical and optical transceivers and other network devices. In some embodiments, the systems and methods are configured to intermittently sample a signal waveform transmitted along a communication channel to obtain a plurality of samples. For example, the signal waveform may include a series of modulated symbols encoded over time. The sampling can be performed at a sampling rate significantly lower than a symbol rate of the signal waveform. Next, the systems and methods can map the plurality of samples onto a two-dimensional diagram showing distinct amplitude levels and modulation characteristics. The two-dimensional diagram can be analyzed to determine signal quality of the signal waveform. Furthermore, according to some embodiments, the signal waveform may have a four-level Pulse Amplitude Modulation (PAM4) format with two bits per symbol. Thus, the two-dimensional diagram described herein can have a "window frame" format showing four distinct amplitude levels and transitions between each pair of the four distinct amplitude levels. The window frame patterns are described in more detail below.

Symbol Rate and PAM4

A signal waveform includes information that can be divided into symbols, where each symbol has a predefined symbol period or unit of time within which the pertinent information is contained. The symbol rate is the number of symbol changes, waveform changes, or signaling events that occur across a transmission medium per unit of time. For instance, the symbol rate can also be referred to as the modulation rate or Baud rate and can be measured in Baud or symbols per second. The symbol rate combined with number of bits per symbol determines the capacity of a channel. With respect to NRZ and PAM2, each NRZ symbol includes one bit, whereas PAM4 symbol includes two bits. Therefore, PAM4 allows two times the amount of data transfer in the same amount of time.

NRZ

Figure 1A:
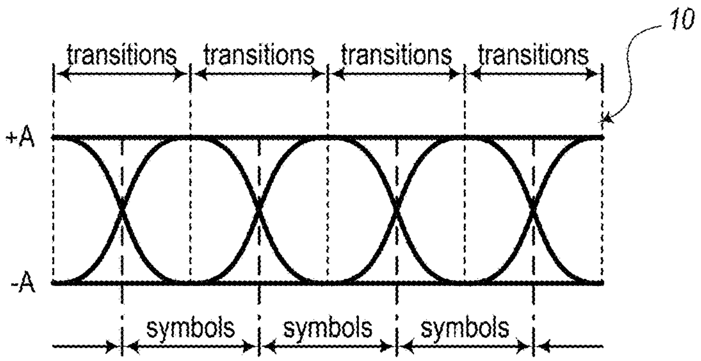
FIG. 1A is an eye diagram showing an example of an ideal Non-Return-to-Zero (NRZ) digital signal and FIG. 1B is an eye diagram of an ideal four-level Pulse Amplitude Modulation (PAM4) signal waveform.

FIG. 1A is an eye diagram 10 showing an example of an ideal NRZ digital signal. Based on an accumulation of signals, the eye diagram 10 shows not only the symbol values (+A, −A), but also the transitional characteristics when the waveform goes from one level to another. When plotted together, the accumulation of signals results in the eye diagram 10, according to this ideal condition in which there is little or no noise, distortion, interference, dispersion, jitter, etc. The ideal plot shows the high voltage level (+A) at a top rail, the low voltage level (−A) at a bottom rail, transitions from high to low, and transitions from low to high. Of course, the eye diagram 10 is given its name because the plot resembles a series of eyes. In the real world, however, the lines of the eye diagram 10 will not be as predictable and an observation (e.g., using a computer display) may indicate that the waveform is experiencing noise, distortion, interference, dispersion, jitter, etc. Also, for comparison, FIG. 1B is an eye diagram 12 showing an ideal PAM4 signal.

Figure 1B:
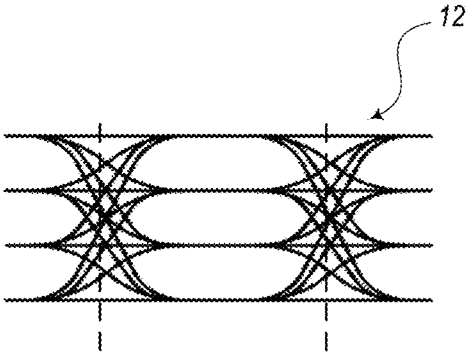

Thus, the pattern shown in the eye diagram 10 of FIGS. 1A and 1B may be a computer display in which a digital signal from a receiver is repetitively sampled and applied to the vertical input (y-axis), while the data rate is used to trigger the horizontal sweep (x-axis). The eye diagram 10 can be used to evaluate the negative signal effects on the performance of a baseband pulse-transmission system. In some respects, the eye diagram 10 may be a visualization of a signal probability distribution function.

The embodiments described in the present disclosure are configured to automatically monitor the quality of a signal waveform. In some cases, the quality of a signal may be a measure of a signal's characteristics visually looking as similar as possible to the ideal pattern of the eye diagram 10 of FIGS. 1A and 1B when applied to systems using NRZ, PAM2, etc. In other words, a signal with high quality may also be defined as having relatively small amounts of noise, distortion, interference, dispersion, jitter, etc. It should be noted that in a PAM4 system, a signal plot will not have an eye pattern similar to the eye diagram 10 of FIGS. 1A and 1B, but instead will have a more complex pattern, as described below. Again, quality of a PAM4 signal can be evaluated by comparing it to an ideal pattern.

The signal quality monitoring circuits described in the present disclosure can be implemented in a separate Application-Specific Integrated Circuit (ASIC) chiplet. The ASIC chiplet, for example, may be integrated into an existing optical transceiver (e.g., Linear Drive Optical (LDO) module, Linear Pluggable Optical (LPO) module, etc.). For example, in some cases, the power consumption of an ASIC chiplet for monitoring signal quality may be of the order of 100-200 mW during monitoring and less while idle, which is considerably smaller than the ~8 W of power consumption of an 800 G LDO XCVR.

In some embodiments, additional functionality may be added to optical transceivers for enabling the signal quality monitoring described herein. For example, the optical transceivers may include a Continuous Time Linear Equalization (CTLE) module added on a Tx side thereof. Also, modulator/laser driver may be added and/or Trans-Impedance Amplifier (TIA) RF line driver on the Rx side thereof.

Such signal quality monitoring can be beneficial at 100 Gbps PAM4 rate. In some cases, signal quality monitoring may be important at 200 Gbps rates and higher, where distortion may be high and margins are small.

In some respects, the networking industry has satisfied many bandwidth demand trends by introducing new generations of both electrical and optical components. Electrical switching ASICs have increased from 25 Terabits per second (25 Tbps) to 50 Tbps, while developments for 100 Tbps Ethernet switching is near. These elements are projected to have 1024×100 G ports or 512×200 G ports. These ASICs are typically interconnected into a large-scale network using electrical cables for shorter reaches (e.g., on the order of ~1 m inside a rack) and optical cables for longer reaches over 1 m in length between racks.

Figure 2:
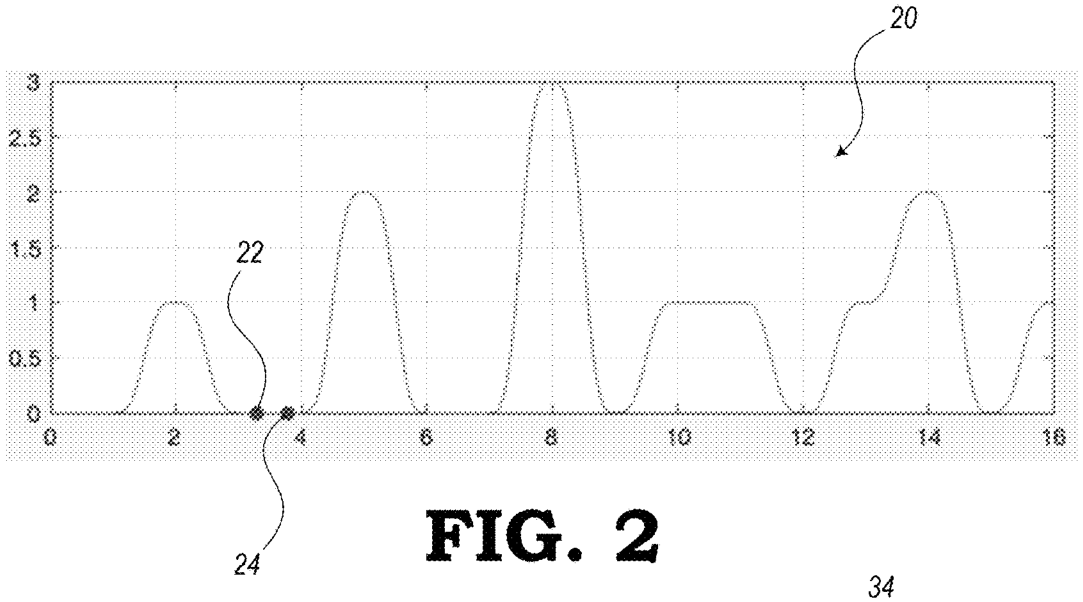
FIG. 2 is a diagram showing an example of a series of symbols of a four-level PAM4 signal waveform.

FIG. 2 is a diagram showing an example of a portion of a signal waveform 20 including a series of symbols in a PAM4 system. In this example, 17 symbols are included over time (x-axis) and range in height from 0 (i.e., binary 00) to 3 (i.e., binary 11). The signal waveform 20 in this example includes 17 values in a series 0, 0, 1, 0, 0, 2, 0, 0, 3, 0, 1, 1, 0, 1, 2, 0, 1. Also, as suggested above, the signal waveform 20 includes transition portions when the value (or level) from one symbol to the next changes. For example, from symbol 7 (i.e., value 0) to symbol 8 (i.e., value 3), the signal waveform 20 transitions with a steep slope. In another example, the signal waveform 20 may remain flat when the value (voltage level) does not change from one symbol to the next, such as in the case of symbols 10 and 11, which both have value 1. In some embodiments, the levels (or voltage levels) may range from 0 voltage to 400 mV, where binary 00 is at 0 volts, binary 01 is at 133 mV, binary 10 is at 266 mV, and binary 11 is at 400 mV.

Figure 3A:
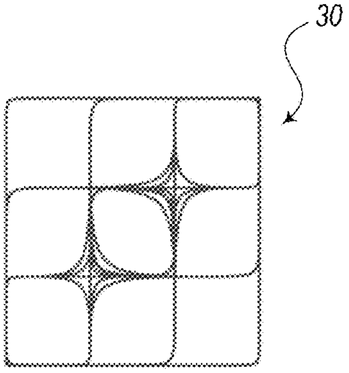
FIG. 3A is a window frame diagram showing an example based on an ideal PAM4 signal waveform.
Figure 3B:
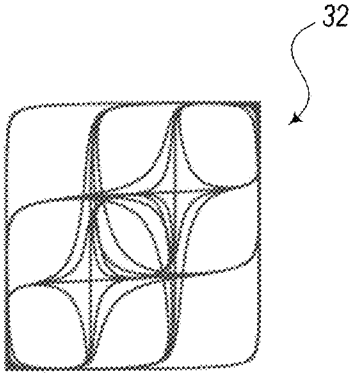
FIG. 3B is a window frame diagram showing an example based on a PAM4 signal having a small amount of distortion.
Figure 3C:
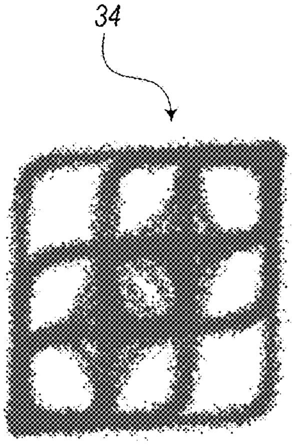
FIG. 3C is a window frame diagram showing an example based on a PAM4 signal having more severe distortion and noise.

According to various embodiments of the present disclosure, the exact signal waveform does not necessarily need to be obtained and therefore no data is obtained. Instead, the sampling rate for obtaining samples may be significantly lower than the symbol rate of the signal waveform 20. In one example, the symbol rate may be 100 giga-symbols per second (100 GS/s) while the sampling rate may be 100 MHZ (or 100 million samples per second). However, when the hundreds or thousands of samples are accumulated over a certain period of time (e.g., 0.1 seconds), the various portions of different symbols can be obtained, either holding steady at a fixed voltage level or transitioning from one voltage level to another. FIGS. 3A-3C show examples of accumulated samples plotted in a two-dimensional diagram.

Because of the much lower sampling rate, one sample may be taken for every 1000 symbols or so. With enough samples obtained and with the sampling being taken at different offset points within the symbols, a complete plot (without gaps) may be obtained, similar to the completion of the eye diagram 10 of FIGS. 1A and 1B. In some embodiments, samples may be obtained in pairs every 1000 or 2000 symbols. As shown in FIG. 2, a pair of sample points are represented. A first sample point 22 (e.g., taken at about 30% of the distance from symbol time 3 to symbol time 4) and a second sample point 24 (e.g., taken at about 80% of the distance from symbol time 3 to symbol time 4) are a sample pair that are offset from each other by about one half of a symbol period. That is, there may be a half-symbol delay from the first sample point 22 to the second sample point 24.

FIG. 3A is a two-dimensional plot, referred to herein as a "window frame" diagram 30, showing an example corresponding to an ideal PAM4 signal waveform. In this example, the window frame diagram 30 represents a situation where there is little or no interference, noise, dispersion, jitter, etc. and the lines at each value and transitioning from one value to another are consistent and clean. The window frame diagram 30, in the ideal scenario, resembles a window frame having a grille/grid pattern that separates the window into nine different "window panes" (i.e., "9-lite").

In some cases, the window frame diagram 30 can be displayed on a computer display or may be presented to a user interface of a user device for displaying the pattern thereon. According to some embodiments, a signal processing device may be configured to use image processing techniques for analyzing the window frame diagram 30 and using this as a point of comparison to which other window frame diagrams can be compared. Then, by image processing the real-world diagrams, a measure of signal quality can be detected, based on a level of similarity to the window frame diagram 30 or ideal pattern.

FIG. 3B is a second window frame diagram 32 showing an example corresponding to a PAM4 signal waveform having a small amount of distortion caused by signal bandwidth loss. When compared with the image pattern, a signal processing device may be configured to determine the quality of the signal waveform, which is represented by the accumulated plot of the second window frame diagram 32. For example, since the second window frame diagram 32 may be determined to closely match the ideal pattern, the processing device may determine that the corresponding signal waveform may have relatively high quality.

FIG. 3C is a third window frame diagram 34 showing an example corresponding to a PAM4 signal waveform having more severe distortion and noise. In this case, compared with the ideal pattern, the third window frame diagram 34 includes messy lines and the "window panes" are more closed. Thus, the signal processing device may determine that the signal waveform, which is represented by the sample point plot of the third window frame diagram 34, has relatively high distortion and relatively low quality. In some embodiments, numerical values may be used to quantify the signal quality.

It may be noted that sampling may be referred to as asynchronous with the PAM4 symbols. This may result in the effective mapping out of many different symbol sequences, positions, and transitions. The sample point along the entire length of a sample period may be randomly determined, may be pseudo-random, or may include a set pattern to ensure that a certain number of samples will essentially fill all the spaces in the window frame diagram. In some embodiments, an ML model may be trained to recognize particular 2D diagram shapes and associate them with specific distortions.

Thus, the window frame diagrams are examples of 2D diagrams that are obtained by simulating some representative impairments with a measurement using ½ symbol relative delay. FIG. 3A shows a baseline clean PAM4 diagram, which is unlikely to be realized in practice, but essentially sets a guide for later comparison. FIG. 3B is a PAM4 diagram that may include, for example, Tx PCB loss modeled as a first order Low Pass Filter (LPF). FIG. 3C is a PAM4 diagram that includes Tx PCB loss, Additive While Gaussian Noise (AWGN) corresponding to TIA thermal noise, and Rx LPF.

Fully Retimed Optical Transceivers (XCVRs)

Figure 4:
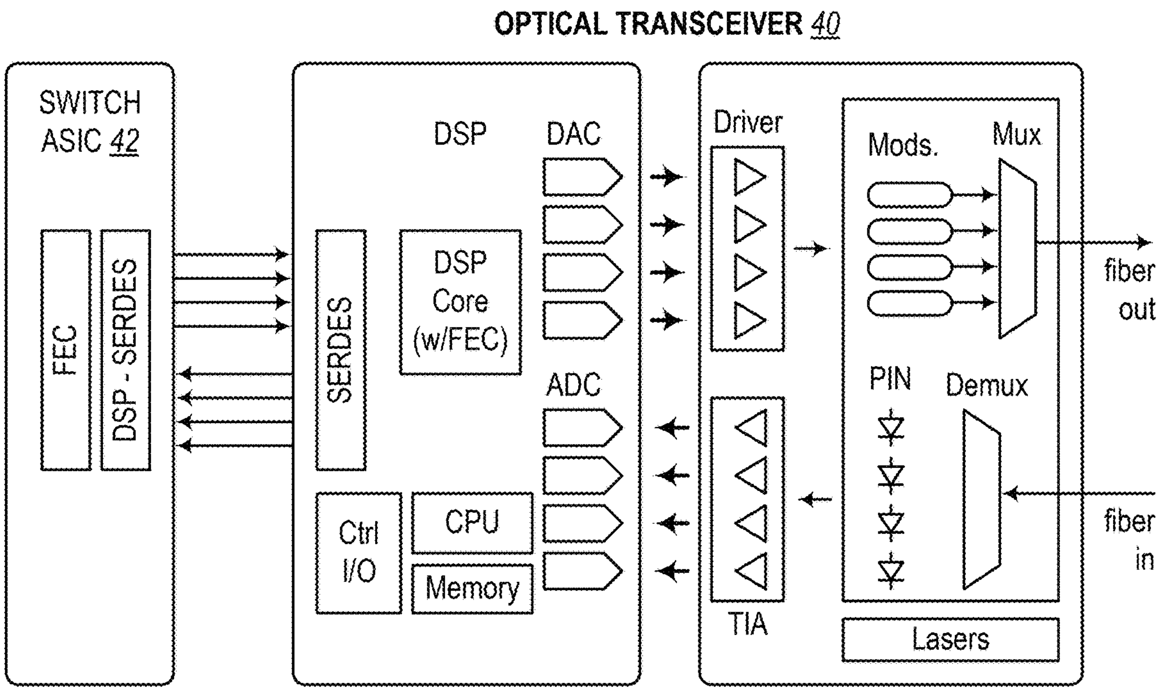
FIG. 4 is a schematic diagram showing an optical transceiver connected to a switch ASIC, according to various embodiments.

FIG. 4 is a schematic diagram showing an embodiment of an optical transceiver 40, which is configured to be connected to a switch ASIC 42. The switch ASIC 42 includes a Forward Error Correction (FEC) device and a Digital Signal Processor (DSP) with Serializer/Deserializer (SerDes) functionality. Deserialized (parallel) signals are passed to the optical transceiver 40, which includes SerDes and DSP core (with FEC) in a transmitter path. The optical transceiver 40 further includes Digital-to-Analog Converters (DACs). The transmitter path also includes drivers, modulators, and a multiplexer that provides a fiber output signal.

In a receiver path, the optical transceiver 40 receives a fiber input at a demultiplexer and includes PIN photodetectors (or photodiodes). The optical transceiver 40 further includes lasers and TIAs. Also, in the receiver path, the optical transceiver 40 includes Analog-to-Digital Converters (ADCs), a CPU, memory, and control I/O devices. Then, the SerDes of the optical transceiver 40 provides deserialized signals back to the switch ASIC 42.

Optical interface power (e.g., co-packaged with the switch ASIC 42, on-board the optical transceiver 40, or employed in a pluggable) constitutes a large fraction of both network cost and power. For example, a typical switching ASIC may cost ~$0.1/Gb and consume ~14 pJ/bit. A short reach (e.g., inside a Data Center) may include optical pluggables with 400 Gb and 800 Gb capacity and cost ~$1/Gb and consume ~20 pJ/bit. Therefore, inside the Data Center, it would behoove the networking industry to continue to focus on reducing both cost and power of optical transceivers and interconnects.

The optical transceiver 40 of FIG. 4 may represent current optical IO interface configurations. One aspect to note is that the optical transceiver 40, or Intensity Modulated Direct Detect (IMDD) Pluggable XCVR, is fully bookended and includes a DSP core that fully decodes and retimes the optical signal. Also, the optical transceiver 40 is configured to provide optical link performance telemetry and additionally provides signal regeneration across the electrical channel connected to the external switch ASIC 42. Therefore, any total link performance problems can be identified and isolated to the RF channels and/or to the optical link itself. Similar to the optical transceiver 40, Active Electrical Cables (AECs) may provide full signal recovery, retiming, and FEC termination functions. However, they also incur a high cost and consume large amounts of power.

Optical Transceiver without Retiming

Figure 5:
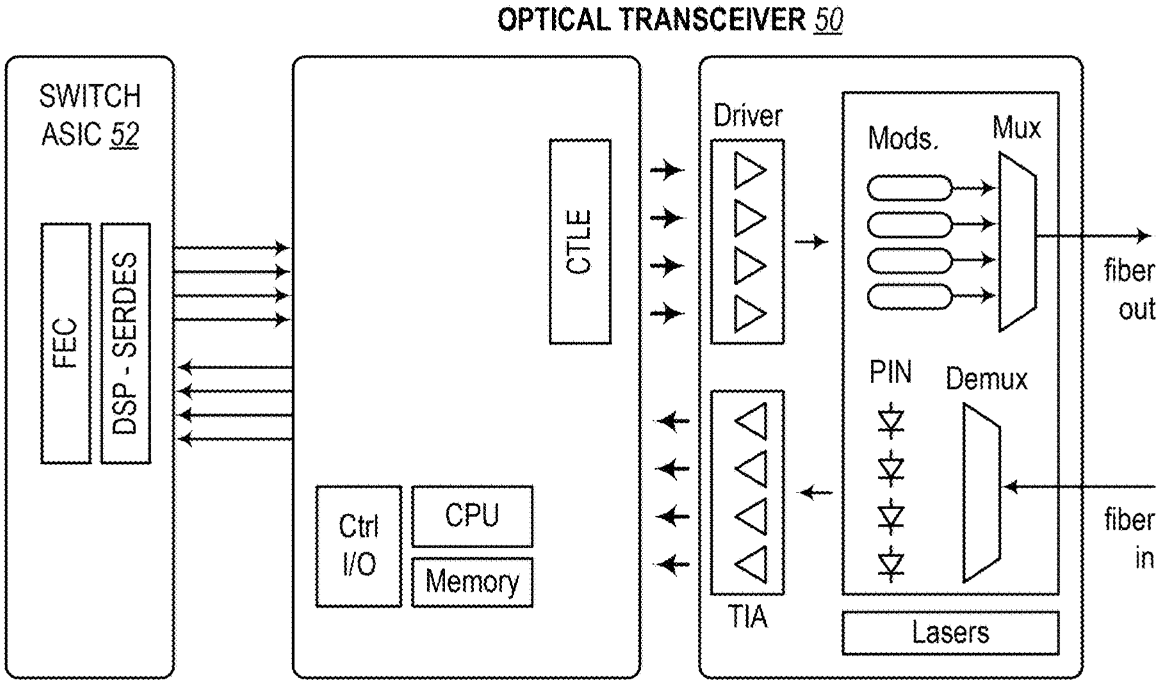
FIG. 5 is a schematic diagram showing another optical transceiver connected to a switch ASIC, according to various embodiments.

FIG. 5 is a schematic diagram showing an embodiment of another optical transceiver 50, which may also be connected to a switch ASIC 52. In this embodiment, the SerDes and DSP core (w/FEC) has been removed with respect to the embodiment of FIG. 4. Also, the DACs and ADCs have been removed and a Continuous Time Linear Equalization (CTLE) device has been added.

Unfortunately, both the SERDES and DSP core, which are included in the IMDD Pluggable of FIG. 4, use expensive ultra-deep submicron CMOS (7 nm, 5 nm, 3 nm) and consume ~40% of the total power of the Pluggable. Therefore, there is an incentive to reduce RF channel loss as much as possible, and completely remove both SERDES and DSP core from the optical IO XCVR. In a sense, the optical transceiver 50 essentially becomes a simple quasi-linear remodulator. The optical transceiver 50 is then configured to take electrical NRZ or PAM signals from the SerDes of the switch ASIC 52 and remodulate them onto optical carrier (fiber out), direct-detect optical power on the receiver side (fiber in), and drive the electrical NRZ or PAM signal into the ASIC SERDES.

A small amount of CTLE may be added to compensate for some Tx-side RF channel loss. In some embodiments, the optical transceiver 50 may be configured as a Linear Drive Optical (LDO) device or Linear Pluggable Optical (LPO) device and may act as a simple media converter (e.g., converting between electrical and optical domains).

FIG. 6 is a table 60 showing an example of advantages and disadvantages of different types of optical transceivers with respect to various factors. The table 60 compares retimed pluggables (e.g., the optical transceiver 40 of FIG. 4), linear-drive pluggables (e.g., the optical transceiver 50 of FIG. 5), and linear-drive Co-Packaged Optics (CPO) devices. One goal of the present disclosure is to implement linear drive pluggables (e.g., optical transceiver 50) to improve upon its late binding commitment, link performance, and link accountability (circled) to reduce the cost and power consumption without the need to use expensive retiming circuits.

In particular, a drawback of LDO/LPO implementations is the loss of performance monitoring and isolation. If there is a communication link problem between interconnected Switch ASICs, it is difficult to identify where the problem occurred: on ASIC SERDES, RF channel, optical XCVR, etc. Therefore, it is also more difficult to take remedial actions and repairs.

Therefore, to overcome these issues, the present disclosure provides a simple, inexpensive, low-power circuit, which can provide signal quality monitoring and telemetry functions inside an optical XCVR. Since it is not necessary to recover data in these embodiments, it is possible to use low rate signal sub-sampling and provide approaches which may be synchronous or asynchronous with respect to the data signal.

It is believed that the embodiments disclosure herein include novelty with respect to conventional systems and circuits. That is, it is believed that conventional systems and circuits do not include performance monitoring, telemetry, and problem isolation that can be employed in circuits integrated into LDO/LPO XCVRs.

Signal Quality Monitoring Circuits

Figure 7:
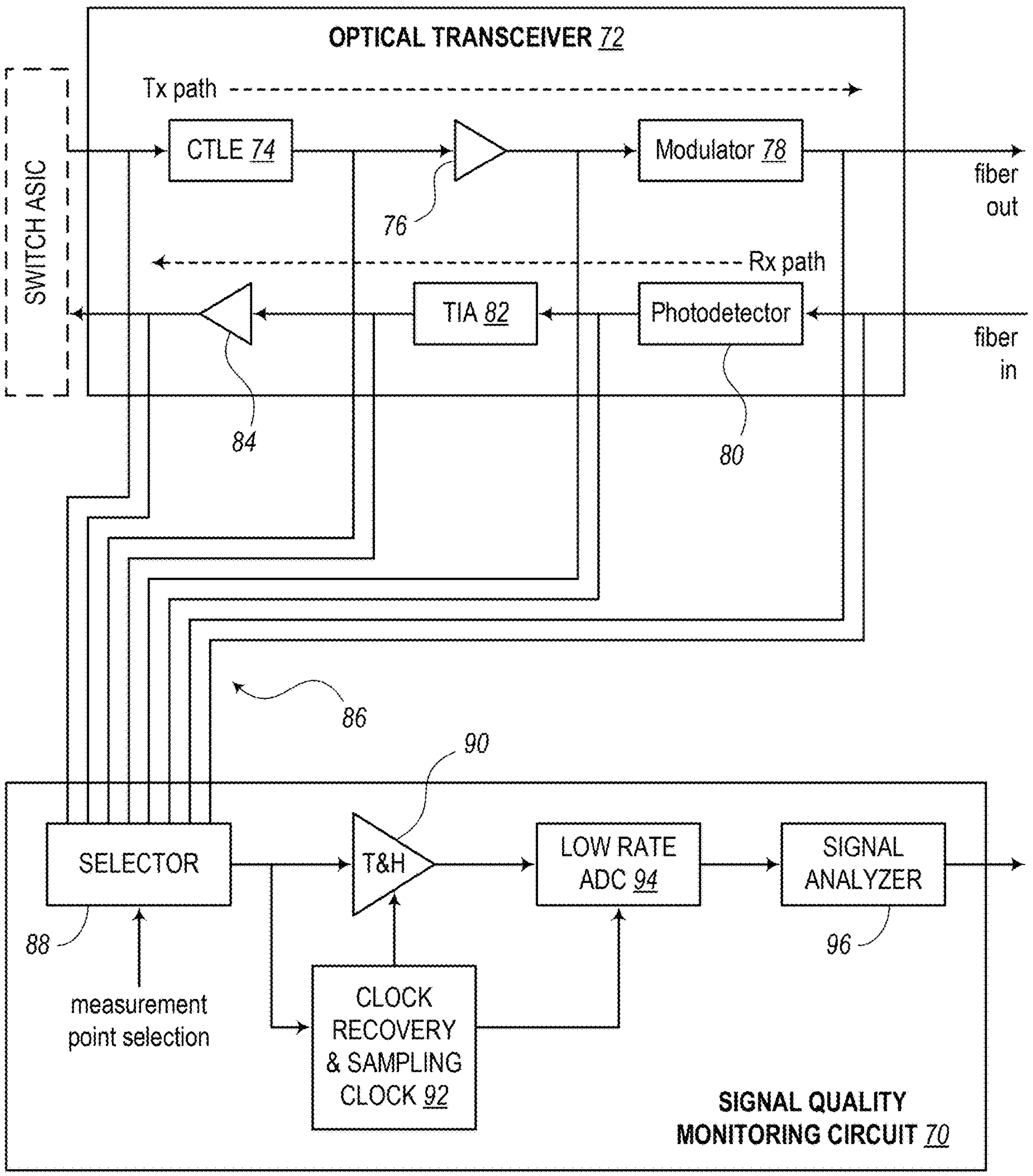
FIG. 7 is a block diagram showing a first circuit for monitoring the signal quality of signal waveforms propagating through an optical transceiver, according to various embodiments of the present disclosure.

FIG. 7 is a block diagram showing an embodiment of a circuit 70 for monitoring the signal quality of signal waveforms propagating through an optical transceiver 72. For example, the optical transceiver 72 may be the same as or similar to the optical transceiver 50 of FIG. 5. The optical transceiver 72 may be connected to a switch ASIC (e.g., switch ASIC 52) and may include a transmitter (Tx) path leading from the switch ASIC to a fiber output and a receiver (Rx) path leading from a fiber input to the switch ASIC. The Tx path of the optical transceiver 72 includes a CLTE device 74, a driver 76, and a modulator 78. The Rx path includes a photodetector 80, a TIA circuit 82, and a driver 84. In addition, the optical transceiver 72 may include one or more RF taps configured to intercept signal waveforms propagating at different points along the Tx path and Rx path. The RF taps include telemetry links 86 leading to the circuit 70.

The circuit 70 includes a selector 88 configured to receive information of the signal waveforms from the telemetry links 86 and select one tap from an input of a measurement point selection. The circuit 70 further includes a Track and Hold (T&H) amplifier circuit 90, a clock recovery and sampling clock 92, a low rate ADC 94, and a signal analyzer 96. The selected measurement tap from the optical transceiver 72 is forwarded by the selector 88 to the T&H amplifier circuit 90 and clock recovery and sampling clock 92. The clock recovery and sampling clock 92 is configured to cause the T&H amplifier circuit 90 and low rate ADC 94 to sample the signal waveform at one or more specific (typically center of the Eye) points along the symbol period of NRZ or PAM4 signal waveform. The low rate ADC 94 may be implemented with a low power design in CMOS and may have power levels well below 100 mW, thereby conserving power with respect to other solutions.

The signal analyzer 96 is configured to receive digital sample point information and accumulate a plurality (e.g., thousands, millions, etc.) of samples of the signal waveform sampled over a period of time. The signal analyzer 96 may include processing functionality to virtually plot the samples into an eye diagram for NRZ or PAM implementations (see FIG. 1A). Furthermore, the signal analyzer 96 may analyze characteristics of the plot to determine if the signal has experienced noise, distortion, etc. From this analysis, the signal analyzer 96 may determine and/or output a measure or value that may be representative of signal quality (e.g., SNR). In some embodiments, the signal analyzer 96 may provide an output to a user device, allowing a user to view the eye diagram on a user interface.

In some embodiments, the circuit 70 may be added to an LDO module or LPO module inside a Data Center pluggable module or optical transceiver. Also, the circuit 70 may be integrated in an IMDD and may operate using NRZ signals, PAM4 signals, or other suitable signals having any number (e.g., two, four, eight, sixteen, and so on) of bits per symbol.

In some respects, the circuit 70 of FIG. 7 may be referred to as a "synchronous" sampling circuit, whereby only a single sample per symbol is obtained and the signal analyzer 96 can map a PAM4 eye diagram by controlled shifting of sampling point relative to symbol timing.

Figure 8:
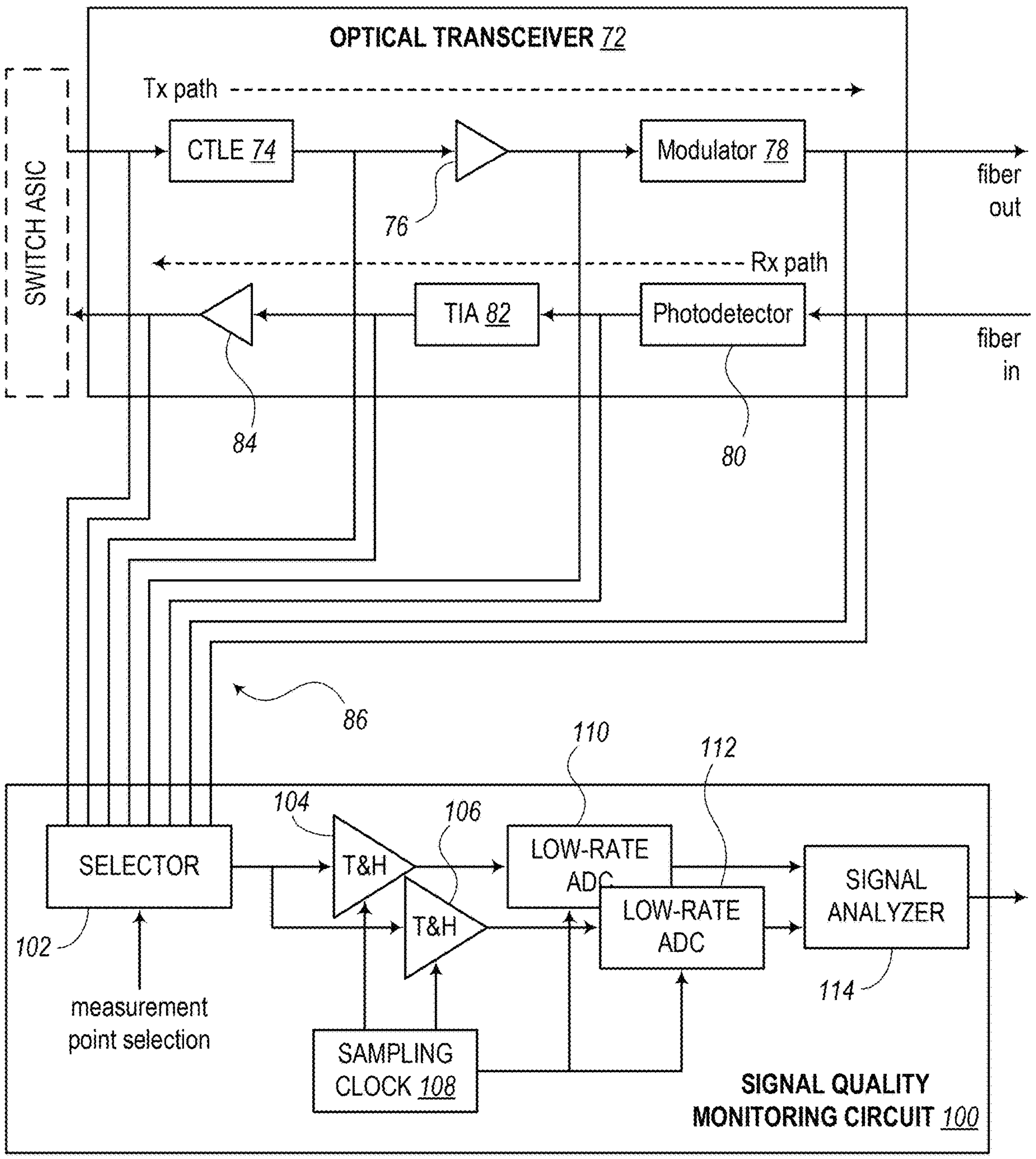
FIG. 8 is a block diagram showing another circuit for monitoring the signal quality of signal waveforms propagating through an optical transceiver, according to various embodiments of the present disclosure.

FIG. 8 is a block diagram showing an embodiment of another circuit 100 for monitoring the signal quality of signal waveforms propagating through the optical transceiver 72. The circuit 100 includes many similarities to the circuit 70 of FIG. 7. As illustrated in this embodiment, the circuit 100 includes a selector 102 configured to receive telemetry information from telemetry links 86. The selector 102 forwards the RF tap information to first and second T&H amplifier circuits 104, 106. A sampling clock 108 is configured to signal the first and second T&H amplifier circuits 104, 106 to sample and hold the signal waveform information with a predetermined delay between the two (e.g., one half of a symbol period).

First and second low rate ADCs 110, 112 are configured to obtain the sampled signals based on input from the sampling clock 108. The low rate ADCs 110, 112 send digital sample information to the signal analyzer 114. In this embodiment, pairs of samples may be obtained and forwarded to the signal analyzer 114. The signal analyzer 114 may operate in a manner different from the signal analyzer 96 shown in FIG. 7 by plotting points in a two-dimension window frame diagram, with subsequent image analysis, and other processing functions. The low rate ADCs 110, 112 may be implemented in CMOS and may be low power devices using less than 100 mW.

In some respects, the circuit 100 of FIG. 8 may be referred to as an "asynchronous" sampling circuit, whereby a pair of samples per symbol is obtained and the signal analyzer 114 can map a PAM4 window frame diagram by controlled shifting of a sampling point of the first sample relative to symbol timing and then sampling at a second sampling point relative to the first. In some embodiments, the difference between the first and second samples may be half of a symbol period.

The circuit 100 may be configured to use broadband RF taps to provide a copy of the electrical signal to the broadband selector (e.g., selector 102). The selector 102 chooses from among many possible test points, which can be along the Tx path or Rx path, or alternatively may include several internal module channels. It may be sufficient to measure signal quality periodically or intermittently using any suitable strategy for selecting a sampling point along the symbol period. The circuit 100 may be time shared across many test points, which can reduce cost and power. The T&H amplifier circuits 104, 106 may be wideband devices with bandwidth sufficient to accommodate a signal symbol rate that follows the incoming signal (e.g., 40 GHz and higher) propagating along the optical transceiver 72. The signal may be periodically sampled using an asynchronous clock (e.g., sampling clock 108). The sampling clock 108 can be at a much lower period (e.g., sampling at a 100 MHz rate) compared to the signal. The sampling clock 108 similarly clocks the low rate ADCs 110, 112, which digitize the signal samples and pass them to the signal analyzer 114 for signal processing and analysis. Again, the circuit 100 is configured to have two sampling points per sampled symbol.

The circuit 100 may be added to LDO/LPO inside Data Center pluggable modules, optical transceivers, or IMDD using NRZ, PAM4, etc. The circuit 100 adopts a two-sample asynchronous signal measurement and analysis approach. In this approach, the sampling clock 108 is running asynchronous to the incoming signal. Two samples are obtained with a fixed offset time between them and with a relative delay that is smaller than the incoming signal symbol period (e.g., half of the symbol period).

The circuit 100 may use a technique to extend from NRZ to cover PAM4 signals. This technique, for example, may be similar to a technique described in S. D. Dods, T. B. Anderson, K. Clarke, M. Bakaul and A. Kowalczyk, "Asynchronous Sampling for Optical Performance Monitoring," OFC/NFOEC 2007-2007 Conference on Optical Fiber Communication and the National Fiber Optic Engineers Conference, Anaheim, CA, USA, 2007, pp. 1-3, doi: 10.1109/OFC.2007.4348600, which is incorporated by reference herein.

Sampling point delay can be programmable to accommodate different data rates that may be supported by the LDO/LPO XCVR. Further, the circuit 100 can also be applied to copper cables, such as Active Electrical Copper in cases where a full retimer is absent.

Summarization of Signal Quality Monitoring Circuit Embodiments

Therefore, according to various embodiments of the present disclosure, a circuit for monitoring signal quality may be configured to perform a step of intermittently sampling a signal waveform transmitted along a communication channel to obtain a plurality of samples. For example, the signal waveform may include a series of modulated symbols encoded over time. Also, the signal waveform may be sampled at a sampling rate lower than a symbol rate of the signal waveform. Furthermore, the circuit may also be configured to perform a step of mapping the plurality of samples onto a two-dimensional diagram showing distinct amplitude levels and modulation characteristics. Next, the circuit may then be configured to perform a step of analyzing the two-dimensional diagram to determine signal quality of the signal waveform. In some embodiments, the signal waveform may have a four-level Pulse Amplitude Modulation (PAM4) format with two bits per symbol, wherein the two-dimensional diagram has a window frame format showing four distinct amplitude levels and transitions between each pair of the four distinct amplitude levels.

In accordance with additional embodiments, the communication channel may be a transmitter path or a receiver path of an optical transceiver. The optical transceiver, for example, may be configured as or incorporated in an optical Input/Output (IO) interface, an optical pluggable module, an optical-electrical interconnection module, a media converter, an Intensity Modulated Direct Detect (IMDD) module, a Linear Drive Optical (LDO) module, or a Linear Pluggable Optical (LPO) module. The circuit may be implemented in an Application-Specific Integrated Circuit (ASIC) or chiplet that is separate from the optical transceiver and may be configured to use less than 200 mW of power. Furthermore, the optical transceiver may also include a Continuous Time Linear Equalization (CTLE) component implemented in the transmitter path, a modulator, a laser driver, and/or a Trans-Impedance Amplifier (TIA) RF line driver implemented in the receiver path. In some embodiments, the receiver path of the optical transceiver may include no Serializer/Deserializer (SerDes) component or Digital Signal Processing (DSP) core.

Also, in some embodiments, the action of intermittently sampling the signal waveform may include obtaining pairs of samples, wherein a second sample of each pair is obtained at a fixed offset time after a first sample of the respective pair. For example, the fixed offset time may be smaller than a symbol period related to the symbol rate of the signal waveform. The fixed offset time may be about half of the symbol period. Also, according to some implementations, the symbol rate of the signal waveform may be at least 40 G baud and the sampling rate may be about 100 M samples per second.

Additionally, the action of analyzing the two-dimensional diagram may further include image processing functionality to detect clarity metrics and distortion metrics with respect to the modulation characteristics. The signal quality may be proportional to the clarity metrics and inversely proportional to the distortion metrics. The modulation characteristics may include transition patterns between the distinct amplitude levels. In some embodiments, the circuit may further be configured to perform the step of automatically adjusting settings associated with a transmitter in the communication channel to reduce distortion and improve signal quality.

In some embodiments, the step of intermittently sampling may further include controllably shifting sampling points relative to a symbol period of the signal waveform to allow samples to be obtained at a plurality of different sampling points along the symbol period. The two-dimensional diagram may be a phase space plot, phase portrait, or signal probability distribution function. The two-dimensional diagram may resemble a window frame pattern having a 9-lite framed window with grille muntins. The action of determining the signal quality may include comparing the window frame pattern with an ideal window frame plot.

According to some implementations, the circuit may include a) a selector that receives samples from test point RF taps along the communication channel, b) a sampling clock, c) one or more Track and Hold (T&H) amplifier circuits, d) one or more low rate sampler ADCs, and e) a signal analyzer. The signal analyzer, for example, may use a Machine Learning (ML) model configured to analyze the two-dimensional diagram to detect distortion characteristics and measure a value that represents the signal quality based on the detected distortion characteristics. In some embodiments, the circuit may include no clock recovery, no data recovery, and no retiming functionalities. Also, the circuit may be further configured to send display information to a user interface to allow a user to view 2D oscilloscope-style information indicative of the signal quality.

Further Implementations

Figure 9:
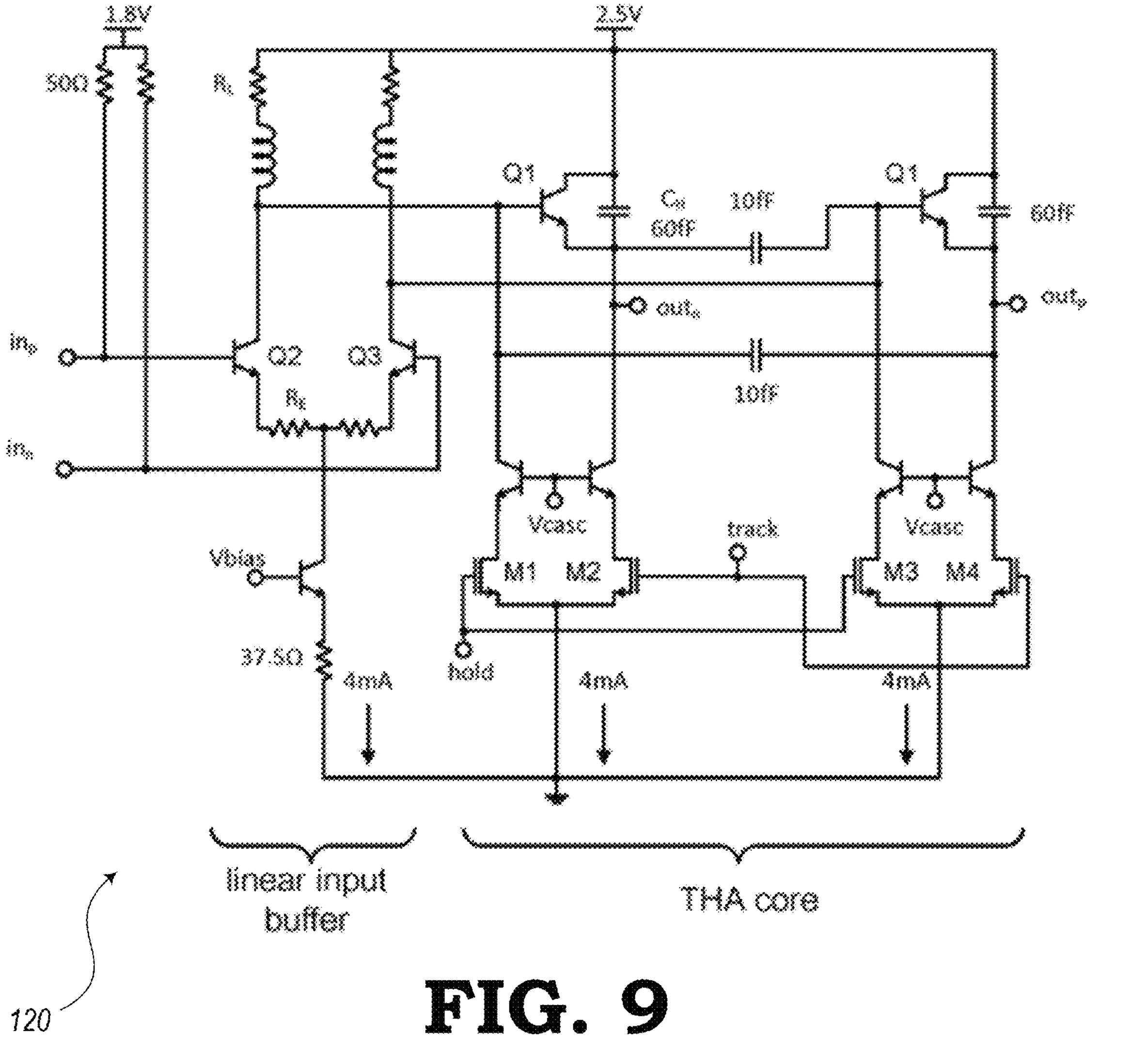
FIG. 9 is a schematic diagram showing an example of one of the Track and Hold (T&H) amplifier circuits shown in FIG. 8, according to various embodiments.

FIG. 9 is a schematic diagram showing an example of a T&H device 120, which shows how one or more of the T&H amplifier circuits 104, 106, shown in FIG. 8, may be implemented. In this embodiment, the T&H device 120 can be implemented using high-performance and low-cost 55 nm BiCMOS technology from STMicroelectronics. This embodiment includes a wideband amplifier with 40 GHz analog bandwidth and includes circuitry that is the similar to circuitry described in K. Vasilakopoulos, A. Cathelin, P. Chevalier, T. Nguyen and S. P. Voinigescu, "A 108 GS/s track and hold amplifier with MOS-HBT switch," 2016 IEEE MTT-S International Microwave Symposium (IMS), San Francisco, CA, USA, 2016, pp. 1-4, doi: 10.1109/MWSYM.2016.7540036, which is incorporated by reference herein. The T&H device 120 may be implemented using a 55 nm BiCMOS process and may include a linear input buffer configured to consume as little as 10 mW. In some embodiments, the T&H amplifier circuit 104, 106 may consume ~20 mW. It may be noted that, while the T&H device 120 may be capable of sampling rates above 100 GS/s, operation at around 100 MHz rates is sufficient for the embodiments described in the present disclosure.

Figure 10:
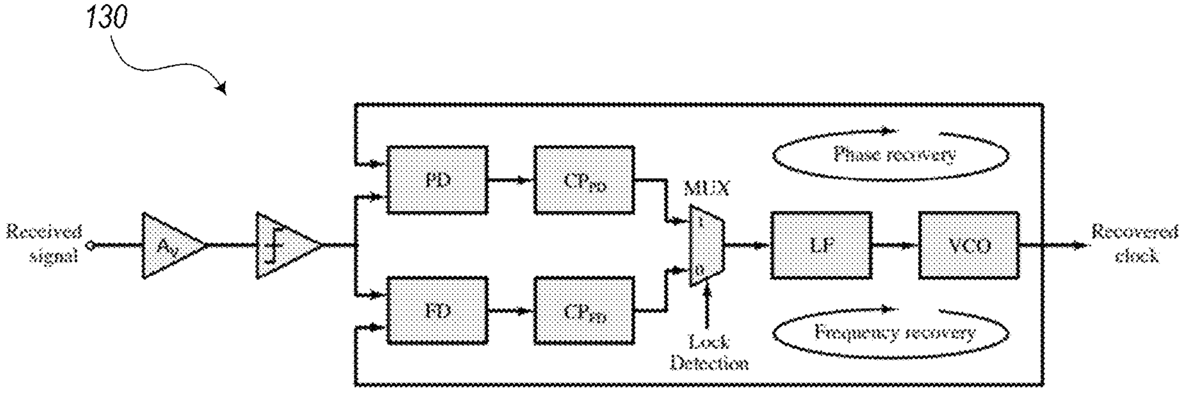
FIG. 10 is a schematic diagram showing an example of a clock recovery circuit associated with the clock recovery and sampling clock shown in FIG. 7, according to various embodiments.

FIG. 10 is a schematic diagram showing an example of a clock recovery circuit 130. In some embodiments, the clock recovery and sampling clock 92 shown in FIG. 7 may be implemented using the clock recovery circuit 130 of FIG. 10. This approach uses an internal Clock recovery from corresponding IMDD (e.g., NRZ, PAM4, etc.) signals, preferably one that can work well with distorted signals and does not require eye equalization, as described in K. Patel, R. Ashok and S. Gupta, "Equalizer-Free Clock Recovery for PAM-4 Optical Interconnects," 2020 International Conference on Signal Processing and Communications (SPCOM), Bangalore, India, 2020, pp. 1-5, doi: 10.1109/SPCOM50965.2020.9179629, which is incorporated by reference herein.

The clock recovery circuit 130 of FIG. 10 includes a Phase Detector (PD) and a Frequency Detector (FD) that is enabled initially to establish a coarse lock to the incoming signal. Subsequently, the PD is enabled to provide continuous eye or window frame sampling position reference point. The clock recovery circuit 130 further includes Charge Pumps for the PD and FD, a multiplexer, a Loop Filter (LF), and a Voltage Controlled Oscillator (VCO). Also, the clock recovery circuit 130 includes a phase recovery feedback loop and a frequency recovery feedback loop. The clock recovery circuit 130 may be configured as a dual-mode frequency and phase detector with PAM4 clock recovery.

Process for Monitoring Signal Quality

Figure 11:
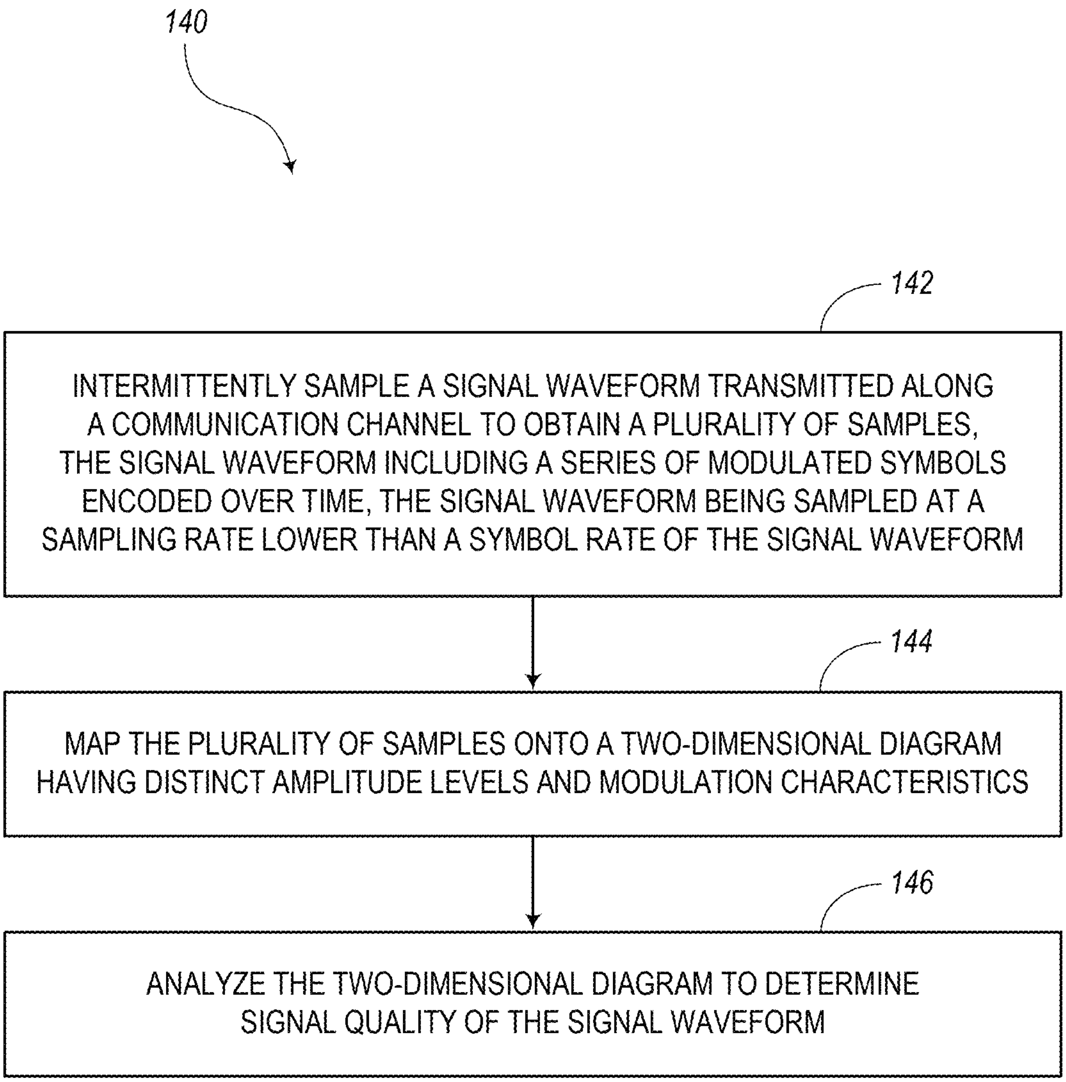
FIG. 11 is a flow diagram showing a process for monitoring signal quality, according to various embodiments.

FIG. 11 is a flow diagram showing an embodiment of a process 140 for monitoring signal quality. As illustrated, the process 140 includes a step of intermittently sampling a signal waveform transmitted along a communication channel to obtain a plurality of samples, as indicated in block 142. The signal waveform includes a series of modulated symbols encoded over time and is being sampled at a sampling rate lower than a symbol rate of the signal waveform. The process 140 further includes a step of mapping the plurality of samples onto a two-dimensional diagram showing distinct amplitude levels and modulation characteristics, as indicated in block 144. Also, the process 140 includes a step of analyzing the two-dimensional diagram to determine signal quality of the signal waveform, as indicated in block 146.

Additional Considerations

Typically, LDO/LPO are media converters that do not specifically support full performance monitoring. That is, there are no data converters in the digital domain. Conventional approaches may normally rely on trial and error to ensure signal quality. However, the embodiments of the present disclosure may use the signal analyzer 96, 114 to automatically determine signal quality based on a plot (e.g., virtual plot). Less distortion in the image of the plot relates to a higher quality signal.

The embodiments include simple, low cost, low power, low complex circuits that can be used to determine signal quality. It may be noted that it is not necessary to detect all the data included in the signal waveforms for errors (e.g., 100 G), but rather the circuit can just periodically take a single sample at remote points along the waveform using a much lower sampling rate (e.g., 100 M samples per second) and then adding the samples to the diagram to enable a visualization (or automatic, virtual visualization) of the quality.

LPOs (or Linear-drive Pluggable Optics) are a type of optical transceiver module used in telecommunications and data communications. These modules are designed to interface directly with linear (analog) signals rather than the more commonly used digital signals. They are typically used in scenarios where maintaining the linearity of the signal is important, such as in analog optical links, radio-over-fiber applications, or high-fidelity signal transmission.

LPOs may include analog signal handling, unlike conventional transceivers that handle digital signals. In this way, the LPOs may preserve the integrity and quality of the signal throughout the transmission. Also, LPOs are designed to minimize noise and distortion, which can be beneficial for applications requiring high signal fidelity. LPOs support high-bandwidth signals, making them suitable for applications like radio frequency (RF) transmission over fiber. They are compatibility with pluggable standards and form factors (e.g., SFP, QSFP), allowing for easy integration into existing network equipment. They may be used in environments where analog signal quality is important, such as in RF over fiber, cable television distribution, and advanced wireless communication systems.

LDOs may broadly refer to optical systems and components that use linear amplification techniques to transmit optical signals. These systems are characterized by their ability to handle linear, analog signals, as opposed to digital signals that are used in most conventional optical communications. They may include linear amplification of optical signals, which ensures that the signal's integrity and linearity are preserved during transmission. These systems are designed to provide high-fidelity signal transmission, crucial for applications where signal distortion must be minimized. Similar to LPOs, they may be used in applications such as RF over fiber, analog signal distribution, cable television, and other scenarios requiring high-quality analog signal transmission. LDOs may also include a variety of components like linear optical amplifiers, modulators, and transceivers designed to handle and maintain the linearity of analog signals.

CONCLUSION

Those skilled in the art will recognize that the various embodiments may include processing circuitry of various types. The processing circuitry might include, but are not limited to, general-purpose microprocessors; Central Processing Units (CPUs); Digital Signal Processors (DSPs); specialized processors such as Network Processors (NPs) or Network Processing Units (NPUs), Graphics Processing Units (GPUS); Field Programmable Gate Arrays (FPGAs); or similar devices. The processing circuitry may operate under the control of unique program instructions stored in their memory (software and/or firmware) to execute, in combination with certain non-processor circuits, either a portion or the entirety of the functionalities described for the methods and/or systems herein. Alternatively, these functions might be executed by a state machine devoid of stored program instructions, or through one or more Application-Specific Integrated Circuits (ASICs), where each function or a combination of functions is realized through dedicated logic or circuit designs. Naturally, a hybrid approach combining these methodologies may be employed. For certain disclosed embodiments, a hardware device, possibly integrated with software, firmware, or both, might be denominated as circuitry, logic, or circuits "configured to" or "adapted to" execute a series of operations, steps, methods, processes, algorithms, functions, or techniques as described herein for various implementations.

Additionally, some embodiments may incorporate a non-transitory computer-readable storage medium that stores computer-readable instructions for programming any combination of a computer, server, appliance, device, module, processor, or circuit (collectively "system"), each potentially equipped with one or more processors. These instructions, when executed, enable the system to perform the functions as delineated and claimed in this document. Such non-transitory computer-readable storage mediums can include, but are not limited to, hard disks, optical storage devices, magnetic storage devices, Read-Only Memory (ROM), Programmable Read-Only Memory (PROM), Erasable Programmable Read-Only Memory (EPROM), Electrically Erasable Programmable Read-Only Memory (EEPROM), Flash memory, etc. The software, once stored on these mediums, includes executable instructions that, upon execution by one or more processors or any programmable circuitry, instruct the processor or circuitry to undertake a series of operations, steps, methods, processes, algorithms, functions, or techniques as detailed herein for the various embodiments.

While the present disclosure has been detailed and depicted through specific embodiments and examples, it is to be understood by those skilled in the art that numerous variations and modifications can perform equivalent functions or yield comparable results. Such alternative embodiments and variations, which may not be explicitly mentioned but achieve the objectives and adhere to the principles disclosed herein, fall within its spirit and scope. Accordingly, they are envisioned and encompassed by this disclosure, warranting protection under the claims associated herewith. Additionally, the present disclosure anticipates combinations and permutations of the described elements, operations, steps, methods, processes, algorithms, functions, techniques, modules, circuits, etc., in any manner conceivable, whether collectively, in subsets, or individually, further broadening the ambit of potential embodiments.

What is claimed is:

1. A circuit for monitoring signal quality, the circuit configured to:

intermittently sample a signal waveform transmitted along a communication channel to obtain a plurality of samples, the signal waveform including a series of modulated symbols of a multilevel modulation format, each symbol being at one of a plurality of discrete signaling levels encoded over time, the signal waveform being sampled at a sampling rate lower than a symbol rate of the signal waveform, wherein intermittently sampling the signal waveform includes obtaining pairs of samples, wherein a second sample of each pair is obtained at a fixed offset time after a first sample of the respective pair, and wherein the fixed offset time is a sub-symbol time interval that is less than one symbol period of the symbol rate of the signal waveform, map the plurality of samples onto a two-dimensional diagram that resolves the plurality of discrete signaling levels as distinct distinct amplitude levels of the diagram and that shows transitions between pairs of the distinct amplitude levels as modulation characteristics of the signal waveform, and analyze the two-dimensional diagram to determine signal quality of the signal waveform based at least on the distinct amplitude levels and the transitions between pairs of the distinct amplitude levels shown in the two-dimensional diagram.

2. The circuit of claim 1, wherein the signal waveform has a four-level Pulse Amplitude Modulation (PAM4) format with two bits per symbol, and wherein the two-dimensional diagram has a window frame format showing four distinct amplitude levels and transitions between each pair of the four distinct amplitude levels.

3. The circuit of claim 1, wherein the communication channel is a transmitter path or a receiver path of a transceiver.

4. The circuit of claim 3, wherein the transceiver is configured as or incorporated in an optical Input/Output (IO) interface, an optical pluggable module, an optical-electrical interconnection module, a media converter, an amplified electrical cable, an Intensity Modulated Direct Detect (IMDD) module, a Linear Drive Optical (LDO) module, or a Linear Pluggable Optical (LPO) module.

5. The circuit of claim 3, wherein the circuit is implemented in an Application-Specific Integrated Circuit (ASIC) or chiplet that is separate from the transceiver, and wherein the circuit is configured to use less than 200 mW of power.

6. The circuit of claim 3, wherein the transceiver further includes one or more of a Continuous Time Linear Equalization (CTLE) component implemented in the transmitter path, a modulator, a laser driver, and a Trans-Impedance Amplifier (TIA) RF line driver implemented in the receiver path.

7. The circuit of claim 3, wherein the receiver path of the transceiver includes no Serializer/Deserializer (SerDes) component or Digital Signal Processing (DSP) core.

8. The circuit of claim 1, wherein first samples of different pairs of samples are taken at different offsets within respective symbol periods of the signal waveform such that the plurality of samples are distributed across the two-dimensional diagram.

9. The circuit of claim 1, wherein the sampling rate is at least 1000 times lower than the symbol rate of the signal waveform.

10. The circuit of claim 1, wherein analyzing the two-dimensional diagram further includes image processing functionality to detect clarity metrics and distortion metrics with respect to the modulation characteristics, the signal quality being proportional to the clarity metrics and inversely proportional to the distortion metrics.

11. The circuit of claim 10, wherein the modulation characteristics include transition patterns between the distinct amplitude levels.

12. The circuit of claim 10, further configured to automatically adjust settings associated with a transmitter in the communication channel to reduce distortion and improve signal quality.

13. The circuit of claim 1, wherein intermittently sampling further includes shifting sampling points relative to a symbol period of the signal waveform to allow samples to be obtained at a plurality of different sampling points along the symbol period, and wherein the two-dimensional diagram is a phase space plot, phase portrait, or signal probability distribution function.

14. The circuit of claim 1, wherein the two-dimensional diagram resembles a window frame pattern having a 9-lite framed window with grille muntins.

15. The circuit of claim 14, wherein determining the signal quality includes comparing the window frame pattern with an ideal window frame plot.

16. The circuit of claim 1, wherein the circuit includes:

a selector that receives samples from a plurality of test point RF taps positioned at different points along the communication channel;

a sampling clock;

one or more Track and Hold (T&H) amplifier circuits;

one or more low rate sampler Analog-to-Digital Converters (ADCs); and a signal analyzer configured to accumulate digital sample information from the one or more ADCs over a period of time and to map the accumulated digital sample information onto the two-dimensional diagram.

17. The circuit of claim 1, wherein the circuit is further configured to send display information to a user interface to allow a user to view 2D oscilloscope-style information indicative of the signal quality.

18. A transceiver module comprising:

a transmitter path;

a receiver path; and a signal quality monitoring circuit configured to intermittently sample a signal waveform transmitted along the transmitter path or receiver path to obtain a plurality of samples, the signal waveform including a series of modulated symbols of a multilevel modulation format, each symbol being at one of a plurality of discrete signaling levels encoded over time, the signal waveform being sampled at a sampling rate lower than a symbol rate of the signal waveform, wherein intermittently sampling the signal waveform includes obtaining pairs of samples, wherein a second sample of each pair is obtained at a fixed offset time after a first sample of the respective pair, and wherein the fixed offset time is a sub-symbol time interval that is less than one symbol period of the symbol rate of the signal waveform, map the plurality of samples onto a two-dimensional diagram that resolves the plurality of discrete signaling levels as distinct amplitude levels of the diagram and that shows transitions between pairs of the distinct amplitude levels as modulation characteristics of the signal waveform, and analyze the two-dimensional diagram to determine signal quality of the signal waveform based at least on the distinct amplitude levels and the transitions between pairs of the distinct amplitude levels shown in the two-dimensional diagram.

19. A method for monitoring signal quality comprising steps of:

intermittently sampling a signal waveform transmitted along a communication channel to obtain a plurality of samples, the signal waveform including a series of modulated symbols of a multilevel modulation format, each symbol being at one of a plurality of discrete signaling levels encoded over time, the signal waveform being sampled at a sampling rate lower than a symbol rate of the signal waveform, wherein intermittently sampling the signal waveform includes obtaining pairs of samples, wherein a second sample of each pair is obtained at a fixed offset time after a first sample of the respective pair, and wherein the fixed offset time is a sub-symbol time interval that is less than one symbol period of the symbol rate of the signal waveform;

mapping the plurality of samples onto a two-dimensional diagram that resolves the plurality of discrete signaling levels as distinct amplitude levels of the diagram and that shows transitions between pairs of the distinct amplitude levels as modulation characteristics of the signal waveform and analyzing the two-dimensional diagram to determine signal quality of the signal waveform based at least on the distinct amplitude levels and the transitions between pairs of the distinct amplitude levels shown in the two-dimensional diagram.

* * * * *